UNITED STATES PATENT OFFICE.

OSKAR GÜNTHER, OF LEVERKUSEN, NEAR COLOGNE, AND ARTHUR ZART, OF OPLADEN, GERMANY, ASSIGNORS TO SYNTHETIC PATENTS CO., INC., OF NEW YORK, N. Y., A CORPORATION OF NEW YORK.

AZO DYESTUFFS.

1,101,739.  Specification of Letters Patent.  Patented June 30, 1914.

No Drawing.  Application filed November 7, 1913. Serial No. 799,717.

*To all whom it may concern:*

Be it known that we, OSKAR GÜNTHER and ARTHUR ZART, doctors of philosophy, chemists, citizens of the German Empire, residing at Leverkusen, near Cologne-on-the Rhine, and Opladen, Germany, have invented new and useful Improvements in New Azo Dyestuffs, of which the following is a specification.

It has been found that valuable dyestuffs capable of being further developed can be obtained by diazotizing the dyestuffs obtainable by coupling any diazo- or diazoazo compounds with 1.5-aminonaphthol or its sulfonic acids in such a way that the diazo compound enters into the nucleus of the naphthalene ring which contains the amino group and by combining the resulting diazo compounds with such derivatives of the 2.amino-5-naphthol-7-sulfonic acid or its derivatives substituted in 1-position as contain diazotizable amino groups in the heteronuclear side chain. Such derivatives of the 2.5.7-aminonaphthol sulfonic acid are e. g. the aminobenzoyl-2.5-aminonaphthol-7-sulfonic acid, aminobenzoyl-2.5-aminonaphthol-1.7-disulfonic acid, the aminophenyl-1.2-naphthothiazole-5-oxy-7-sulfonic acid, the aminophenyl-1.2-naphthimidazole-5-oxy-7-sulfonic acid, the aminobenzoyl-aminobenzoyl-2-amino-5-naphthol-7-sulfonic acid.

The new products are after being dried and pulverized in the shape of their alkaline salts dark powders soluble in water. Upon reduction with stannous chlorid and hydrochloric acid they are broken up into an aromatic amino compound, a 1.4-diamino-5-naphthol compound and a derivative of 2.6-diamino-5-naphthol-7-sulfonic acid containing a diazotizable amino group in the heteronuclear side chain. They dye cotton in dull blue to greenish-black shades, which can be converted (a property which could not have been foreseen) by development with diazotized nitranilin or by diazotation on the fiber and after treatment with suitable developers, such as phenylmethylpyrazolone, aceto-acetic-anilid, etc., into green shades fast to washing and of such purity and fastness to light as could hitherto not have been obtained.

In order to illustrate the new process more fully the following example is given, the parts being by weight:—The diazo compound obtained from 223 parts of 2-naphthylamin-5-sulfonic acid is combined with 303 parts of the sodium salt of the 1-amino-5-naphthol-7-sulfonic acid acetylized in the hydroxy group. The resulting intermediate compound is further diazotized by means of 69 parts of NaNO$_2$ and added to a solution of 380 parts of 4'-aminobenzoyl-2-amino-5-naphthol-7-sulfonic acid (sodium salt); after a further addition of sodium carbonate (if necessary) the acetyl group is removed by boiling the mixture and the dye is salted out. It is after being dried and pulverized in the shape of its sodium salt a dark powder having in a free state most probably the formula:

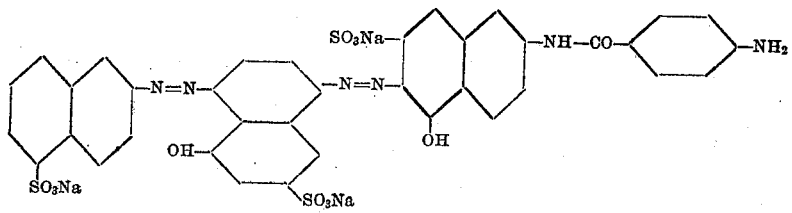

soluble in water with a greenish-blue coloration, yielding upon reduction with stannous chlorid and hydrochloric acid 2-naphthylamin-5-sulfonic acid, 1.4-diamino-5-naphthol-7-sulfonic acid and 2-para-aminobenzoylamino-6-amino-5-naphthol-7-sulfonic acid. It dyes cotton a greenish blue-black which after diazotation and on development with methylphenylpyrazolone changes into a beautiful yellowish-green. It can also be developed with diazotized para-nitranilin to a pure green shade.

Instead of the 2-naphthylamin-5-sulfonic acid other diazotizable aromatic amino compounds and aminoazo compounds can be used e. g. 2-naphthylamin-4.8-disulfonic acid, 1-naphthylamin-4-sulfonic acid, 3-chloro-2-toluidin-4-sulfonic acid, para-nitranilin-ortho-sulfonic acid, amino-azobenzene-disulfonic acid, etc. Instead of the 1.5-amino-naphthol-7-sulfonic acid acidylized in the hydroxyl group this acid itself or 1.5-aminonaphthol or the 1.5-amino-naphthol-6-sulfonic acid can be used, care being taken that the coupling takes place in the nucleus containing the amino group. Instead of the aminobenzoyl-2.5-amino-naphthol-7-sulfonic acid generally such heteronuclear derivatives of the 2.5-aminonaphthol-7-sulfonic acid and their derivatives substituted in 1-position can be used as contain a diazotizable amino group in the heteronuclear side chain, such as aminophenyl-1.2-naphthimidazole-5-oxy-7-sulfonic acid, aminophenyl-1.2-naphthothiazole-5-oxy-7-sulfonic acid, aminobenzoyl-aminobenzoyl-2-amino-5-naphthol-7-sulfonic acid, etc.

We claim:—

1. The new azo dyestuffs which are after being dried and pulverized in the shape of their alkaline salts dark powders soluble in water, yielding upon reduction with stannous chlorid and hydrochloric acid an aromatic amino compound, a 1.4-diamino-5-naphthol compound and a derivative of 2.6-diamino-5-naphthol-7-sulfonic acid containing a heteronuclear side chain with a diazotizable amino group; dyeing cotton in dull blue to greenish-black shades which can be converted by development with diazotized para-nitranilin into green pure shades fast to washing and light, substantially as described.

2. The new azo dyestuffs which are after being dried and pulverized in the shape of their alkaline salts dark powders soluble in water, yielding upon reduction with stannous chlorid and hydrochloric acid an aromatic aminosulfonic acid, a 1.4-diamino-5-naphthol compound and a derivative of 2.6-diamino-5-naphthol-7-sulfonic acid containing a heteronuclear side chain with a diazotizable amino group; dyeing cotton in dull blue to greenish-black shades which can be converted by development with diazotized para-nitranilin into green pure shades fast to washing and light, substantially as described.

3. The new azo dyestuffs which are after being dried and pulverized in the shape of their alkaline salts dark powders soluble in water, yielding upon reduction with stannous chlorid and hydrochloric acid a naphthylamin sulfonic acid, a 1.4-diamino-5-naphthol compound and a derivative of 2.6-diamino-5-naphthol-7-sulfonic acid containing a heteronuclear side chain with a diazotizable amino group; dyeing cotton in dull blue to greenish-black shades which can be converted by development with diazotized para-nitranilin into green pure shades fast to washing and light, substantially as described.

4. The new azo dyestuffs which are after being dried and pulverized in the shape of their alkaline salts dark powders soluble in water, yielding upon reduction with stannous chlorid and hydrochloric acid an aromatic amino compound, a 1.4-diamino-5-naphthol sulfonic acid and a derivative of 2.6-diamino-5-naphthol-7-sulfonic acid containing a heteronuclear side chain with a diazotizable amino group; dyeing cotton in dull blue to greenish-black shades which can be converted by development with diazotized para-nitranilin into green pure shades fast to washing and light, substantially as described.

5. The new azo dyestuffs which are after being dried and pulverized in the shape of their alkaline salts dark powders soluble in water, yielding upon reduction with stannous chlorid and hydrochloric acid an aromatic amino sulfonic acid, a 1.4-diamino-5-naphthol sulfonic acid and a derivative of 2.6-diamino-5-naphthol-7-sulfonic acid containing a heteronuclear side chain with a diazotizable amino group; dyeing cotton in dull blue to greenish-black shades which can be converted by development with diazotized para-nitranilin into green pure shades fast to washing and light, substantially as described.

6. The new azo dyestuffs which are after being dried and pulverized in the shape of their alkaline salts dark powders soluble in water, yielding upon reduction with stannous chlorid and hydrochloric acid a naphthylamin sulfonic acid, a 1.4-diamino-5-naphthol sulfonic acid and a derivative of 2.6-diamino-5-naphthol-7-sulfonic acid containing a heteronuclear side chain with a diazotizable amino group; dyeing cotton in dull blue to greenish-black shades which can be converted by development with diazotized para-nitranilin into green pure shades fast to washing and light, substantially as described.

7. The new azo dyestuff having in the shape of its sodium salt most probably the formula:

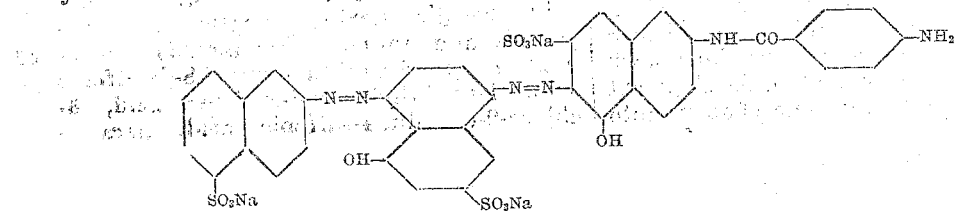

which is after being dried and pulverized a dark powder soluble in water with a greenish-blue coloration; yielding upon reduction with stannous chlorid and hydrochloric acid 2-naphthylamin-5-sulfonic acid, 1.4-diamino-5-naphthol-7-sulfonic acid and 2-para-aminobenzoylamino-6-amino-5-naphthol-7-sulfonic acid; dyeing cotton a greenish blue-black which can be developed with diazotized para-nitranilin into a pure green shade, substantially as described.

In testimony whereof we have hereunto set our hands in the presence of two subscribing witnesses.

OSKAR GÜNTHER. [L. S.]
ARTHUR ZART. [L. S.]

Witnesses:
ALBERT NUFER,
HELEN NUFER.

Copies of this patent may be obtained for five cents each, by addressing the "Commissioner of Patents, Washington, D. C."